Patented Oct. 13, 1936

2,056,960

UNITED STATES PATENT OFFICE 2,056,960

MANUFACTURE OF CYCLIC ETHERS

Henry Dreyfus, London, England

No Drawing. Application February 18, 1932, Serial No. 593,860. In Great Britain March 5, 1931

11 Claims. (Cl. 260—54)

This invention relates to a new manufacture of cyclic compounds containing oxygen in the ring.

I have discovered that valuable condensation products may be obtained by reacting upon di- or poly-halogenated ethers with agents capable of removing halogen and introducing in its place oxygen. This process may be applied with great advantage to the manufacture of cyclic compounds containing oxygen in the ring. Thus for example dioxane may readily be produced by reacting upon $\beta,\beta'$-dichlor-diethyl ether with copper oxide, lead oxide or other agents capable of removing the chlorine atoms and substituting an atom of oxygen. In the same way dimethyl dioxane can be obtained from $\beta,\beta'$-dichlor-dipropyl ether.

The substituted ethers employed in the invention must be halogenated in both radicles. I prefer to employ the $\beta,\beta'$ dichlor derivatives of dialkyl ethers. The invention is not, however, in any way limited to the use of compounds of this type. Thus, for example, I may employ halogen derivatives other than chloro derivatives, for example brom or iodo derivatives, e. g. $\alpha,\alpha'$-dibrom-dimethyl ether, or mixed derivatives. Again, I may employ $\alpha,\alpha'$-derivatives, for example dichlor-dimethyl ether and $\alpha,\alpha'$-dichlor-diethyl ether, or $\alpha,\beta'$-derivatives, for example chlor-methyl-chlorethyl ether. The halogenated ethers may be derivatives of simple or mixed ethers.

The invention is particularly applicable to the production of cyclic compounds containing two atoms of oxygen in a six membered ring, for example dioxane and its derivatives, but is not limited to the production of such compounds.

Suitable agents for use according to the present invention are oxides of metals having a relatively small affinity for oxygen or occupying a relatively low position in the electro-potential series of the elements, for example, oxides of lead, mercury, silver and copper, but any other agents capable of removing chlorine and substituting oxygen may of course be employed. Examples of such other agents are caustic soda and the like, and mixtures of caustic soda or sodium carbonate with the above mentioned oxides.

The metal oxide may be employed in solid form, or may be dispersed or suspended in a suitable liquid medium. The ether may itself constitute the liquid medium, or the ether may be dissolved in a suitable solvent, for example benzene, toluene, xylene, benzine, chloroform or carbon tetrachloride, or may be dispersed or suspended in a non-solvent liquid.

The liquid medium may dissolve the condensation product resulting from the process. Thus, for example the synthesis of dioxane may be effected by reacting with finely divided copper or lead oxide upon $\beta,\beta'$-dichlor-diethyl ether dissolved in a solvent for dioxane, for example any of the solvents specified above or any compatible mixture thereof.

The reaction may be carried out in the absence of water or other hydrolyzing media, for example in the presence of relatively non-polar or inert liquids.

According to another form of the invention agents may be used which will yield oxygen and combine with halogen in the presence of a suitable catalyst for promoting the reaction. For example a di-halogen ether may be heated with water or weak alkali in the presence of a suitable catalyst, for example, metallic iron in powder form or an organic salt of iron, or a mixture of the halogenated ether and the reagent may be passed in vapor form over the catalyst.

The reaction may be carried out in the absence of a liquid reaction medium, for example by reacting upon the liquid halogenated ether with the metal oxide or other suitable reagent, as stated above, or again the vapors of the halogenated ether may be brought into contact with the reagent. The process may or may not be continuous. For example the vapors of the halogenated ether may be passed over the dehalogenating agent contained in a heated chamber, and the resulting vapor mixture may be continuously drawn off and separated.

The surface presented by the copper or lead oxide or other dehalogenating agent may be increased by the use of suitable supporting material, for example pumice, asbestos or the like. The temperature and pressure adopted in any particular case depend to some extent upon the properties of the halogenated ether employed and of the resulting product. Where for example the invention is employed in the manufacture of dioxane the reaction may be carried out at a temperature between about 100° and 170° C. under atmospheric pressure. If desired, the dioxane, which boils at 102° C. may be continuously removed by distillation. This may be achieved, for instance, by providing the reaction still with a fractionating column the top of which is maintained, for instance by condensing a proportion of the dioxane, at a temperature of about 110° C.

The following examples are given by way of illustration, but it is to be clearly understood that the invention is in no way limited thereto.

Example 1

100 parts of ββ'-dichlor-diethyl ether are boiled under reflux with from 60–70 parts of finely divided copper oxide, prepared, for example, by precipitating copper carbonate, filtering and carefully washing the precipitate and then gently heating to obtain the oxide. It is desirable that the mixture be well stirred during the reaction. The course of the reaction may be followed by means of a thermometer, the bulb of which is inserted in the vapor of the boiling liquid. When the transformation is substantially complete, the temperature indicated will decrease, on account of the fact that dioxane boils at 102° C. while the boiling point of the dichlor-ether is about 177° C. When this stage is reached the dioxane may be separated by fractionation.

Example 2

100 parts of chlor-methyl-β-chlor-ethyl ether are heated with from 70 to 80 parts of copper oxide under reflux according to the process described in Example 1, and methylene ethylene dioxide

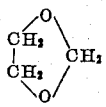

may thus be obtained.

Other cyclic ethers may be obtained from other halogenated ethers, for example, from dichlor-dimethyl-ether or β,β'-dichlor-dipropyl ether, by the method described in the above examples, and instead of copper oxide, lead oxide or any other of the above mentioned reagents may be employed.

What I claim and desire to secure by Letters Patent is:—

1. Process for the production of cyclic ethers, which comprises treating halogen substituted dialkyl ethers, having at least one halogen atom in each alkyl radicle, with an oxide of a metal selected from the group consisting of mercury, silver, lead and copper.

2. Process for the production of cyclic ethers, which comprises treating ββ' dihalogen dialkyl ethers with an oxide of a metal selected from the group consisting of mercury, silver, lead and copper.

3. Process for the production of dioxane, which comprises treating ββ' dichlor-diethyl ether with an oxide of a metal selected from the group consisting of mercury, silver, lead and copper.

4. Process for the production of dioxane, which comprises treating ββ' dichlor-diethyl ether with an oxide of a metal selected from the group consisting of mercury, silver, lead and copper at a temperature between about 100 and 170° C.

5. Process for the production of cyclic ethers, which comprises treating halogen substituted dialkyl ethers, having at least one halogen atom in each alkyl radicle, with oxides of metals which are at least as low in the electro-potential series as lead.

6. Process for the production of cyclic ethers, which comprises treating ββ' dihalogen dialkyl ethers with oxides of metals which are at least as low in the electro-potential series as lead.

7. Process for the production of dioxane, which comprises treating ββ' dichlordiethyl ether with oxides of metals which are at least as low in the electro-potential series as lead.

8. Process for the production of cyclic ethers, which comprises treating halogen substituted dialkyl ethers, having at least one halogen atom in each alkyl radicle, with oxides of metals which are at least as low in the electro-potential series as lead, in the presence of organic solvents for the said alkyl ethers.

9. Process for the production of cyclic ethers, which comprises passing the vapors of halogen substituted dialkyl ethers, having at least one halogen atom in each alkyl radicle, over oxides of metals which are at least as low in the electro-potential series as lead.

10. Process for the production of cyclic ethers, which comprises treating halogen substituted dialkyl ethers, having at least one halogen atom in each alkyl radicle, with an oxide of a metal selected from the group consisting of mercury, silver, lead and copper, in the presence of organic solvents for the said alkyl ethers.

11. Process for the production of cyclic ethers, which comprises passing the vapors of halogen substituted dialkyl ethers, having at least one halogen atom in each alkyl radicle, over an oxide of a metal selected from the group consisting of mercury, silver, lead and copper.

HENRY DREYFUS.